US009961307B1

(12) United States Patent
Weinblatt

(10) Patent No.: US 9,961,307 B1
(45) Date of Patent: May 1, 2018

(54) EYEGLASS RECORDER WITH MULTIPLE SCENE CAMERAS AND SACCADIC MOTION DETECTION

(71) Applicant: Lee S. Weinblatt, Teaneck, NJ (US)

(72) Inventor: Lee S. Weinblatt, Teaneck, NJ (US)

(*) Notice: Subject to any disclaimer, the term of this patent is extended or adjusted under 35 U.S.C. 154(b) by 389 days.

(21) Appl. No.: 14/753,337

(22) Filed: Jun. 29, 2015

Related U.S. Application Data

(60) Provisional application No. 62/018,806, filed on Jun. 30, 2014.

(51) Int. Cl.
*H04N 13/04* (2006.01)
*H04N 9/47* (2006.01)
*H04N 7/18* (2006.01)
*G02B 27/01* (2006.01)
*G06Q 30/02* (2012.01)

(52) U.S. Cl.
CPC ........... *H04N 7/183* (2013.01); *G02B 27/017* (2013.01); *G06Q 30/0201* (2013.01); *G02B 2027/0178* (2013.01)

(58) Field of Classification Search
None
See application file for complete search history.

(56) References Cited

U.S. PATENT DOCUMENTS

| 5,632,742 | A | 5/1997 | Frey et al. |
| 7,641,341 | B2 | 1/2010 | Weinblatt |
| 2009/0018419 | A1* | 1/2009 | Torch ................ A61B 3/0066 600/318 |
| 2011/0077548 | A1* | 3/2011 | Torch ................ A61B 3/112 600/558 |
| 2015/0326570 | A1* | 11/2015 | Publicover ........ G06T 19/006 726/4 |

* cited by examiner

*Primary Examiner* — Chikaodili E Anyikire
(74) *Attorney, Agent, or Firm* — Howard Natter

(57) ABSTRACT

An eyeglass recorder includes multiple scene cameras for respectively recording frontal scenes along the viewer's horizontal line-of-sight and depending scenes at approximately a 45° angle downwardly from the viewer's horizontal line-of-sight. The viewer's eye movement is concurrently monitored to differentiate between the viewing of the recorded frontal and depending scenes and to detect saccadic eye motion for assessment of the viewer's level of interest in the viewed scenes.

14 Claims, 3 Drawing Sheets

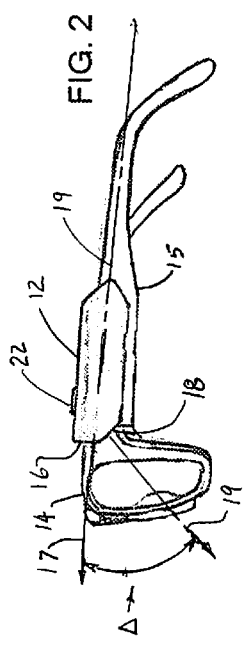
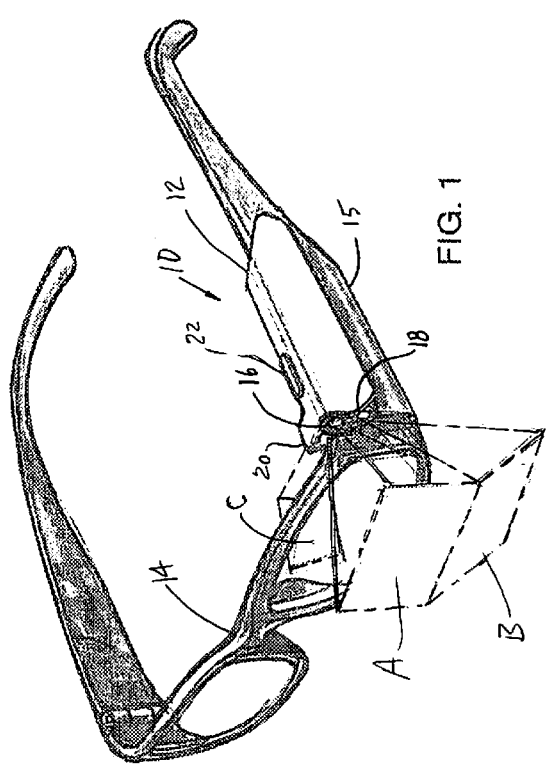

EYEGLASS RECORDER WITH MULTIPLE SCENE CAMERAS AND SACCADIC MOTION DETECTION

RELATED APPLICATION

This application claims priority from U.S. Provisional Patent Application Ser. No. 62/018,806 filed on Jun. 30, 2014, the content of which is hereby incorporated herein by reference.

BACKGROUND OF THE INVENTION

Field of the Invention

This invention relates to consumer market research and especially to an improved method and apparatus for understanding the shopping and usage behavior of consumers.

In particular, the method of this invention concerns the use of an eyeglass recorder with multiple scene cameras for recording what consumers are looking at and saccadic eye movement for assessing their level of interest in the viewed subject matter.

Description of the Related Art

Consumer market research companies and major advertisers have generally been known to use head-mounted eye tracker glasses to observe and record consumer awareness of product packaging, retail shelf placement and generally to obtain an understanding of human behavior. These eye tracker glasses typically include a frontal view, center-mounted, wide angle scene camera that records what the subject is looking at and cameras mounted on the glasses and focused on one or both of the subject's eyes that records the eye movement as the viewer looks at stimuli. The eye tracker glasses further provides an illumination source, such as by infrared light (IR), directed at the subject's eyes to create corneal reflections to target the location of what the subject is looking at.

A disadvantage of these prior eye tracker glasses is that they cannot be used with conventional eyewear or by individuals who wear prescription eyeglasses. Another limitation of these eye tracker glasses is that they require a customized frame for fixed placement of the illumination sources and the cameras. Furthermore, because of the need for reflective illumination these eye tracker glasses cannot function effectively under brightly lighted conditions.

An additional shortcoming of the aforementioned eye tracker glasses is that since the wide angle scene camera is center-mounted it can only scan images directly in front of the subject. Therefore the center mounted camera cannot record what a subject may be reading or examining below eye level, for example, at chest level, as often people rotate their eyes downwardly, to examine objects below eye level rather than to tilt their heads. It is also common for people who wear eyeglasses with bi-focal and/or progressive lenses to move their eyes downwardly in order to utilize the reading portion of the lens, for example, as when examining text on labels. Under these circumstances a center-mounted camera cannot effectively capture the object being viewed below eye level and even if the object could be found in the field of view by using a wide-angle lens there would be too much distortion to be useful, especially for product recognition purposes.

Another limitation of the previously mentioned eye tracker glasses is that although the camera may record where the viewer looks, it cannot analyze the degree of the viewer's interest in the subject matter.

SUMMARY OF THE INVENTION

Briefly, this invention concerns to a method for consumer market research that involves recording what the consumer is looking at, from an eye level and below eye level perspective, monitoring saccadic eye motion and utilizing the visual information for analyzing the consumer's interest in the particular viewed subject matter. An eyeglass recorder having multiple scene cameras is utilized for respectively recording scenes viewed at eye level in front of the consumer and scenes viewed when the consumer is looking downwardly. The consumer's eye movement is concurrently recorded by an eye motion camera focused on the side of the consumer's eye for differentiating between frontal and depending scenes and for detecting and recording saccadic eye emotion. The respective scene and eye motion cameras are contained within a clip cam member that is attachable to conventional eyeglasses or can be integrated into a self-contained frame cam member.

Having thus summarized the invention. it will be seen that it is a preferred object thereof to provide a method and apparatus for consumer market research utilizing an eyeglass recorder that is not subject to the previously mentioned disadvantages, shortcomings and limitations.

It is also a preferred object of this invention is to provide a consumer market research method and apparatus for recording what a consumer is looking at that does not require eye tracking or the need for eye reflected illumination.

Another preferred object of this invention is to provide an eyeglass recorder that is compatible for use with conventional eyewear.

Still another preferred object of this invention is to provide an eyeglass recorder with multiple cameras for simultaneously recording scenes viewed by a consumer at eye level and below eye level.

A further preferred object of this invention is to provide an eyeglass recorder that concurrently records consumer's saccadic eye motion while viewing scenes as a function of eye engagement with the degree of eye engagement being indicative of the consumer's cognitive level of interest in the scene viewed.

With these ends in view, the invention finds embodiment in certain combinations of elements and series of steps by which the aforementioned preferred objects and certain other objects are hereinafter attained, all as more frilly described with reference to the accompanying drawings and the scope of which is more particularly pointed out herein.

BRIEF DESCRIPTION OF THE DRAWINGS

In the accompanying drawings, in which are shown exemplary embodiments of the invention:

FIG. 1 is a perspective view of an eyeglass recorder in accordance with this invention showing a clip cam member attached to conventional eyeglasses;

FIG. 2 is a side elevational view illustrating the clip cam member attached to the eyeglasses shown in FIG. 1;

DETAILED DESCRIPTION OF THE INVENTION

Figure 3:
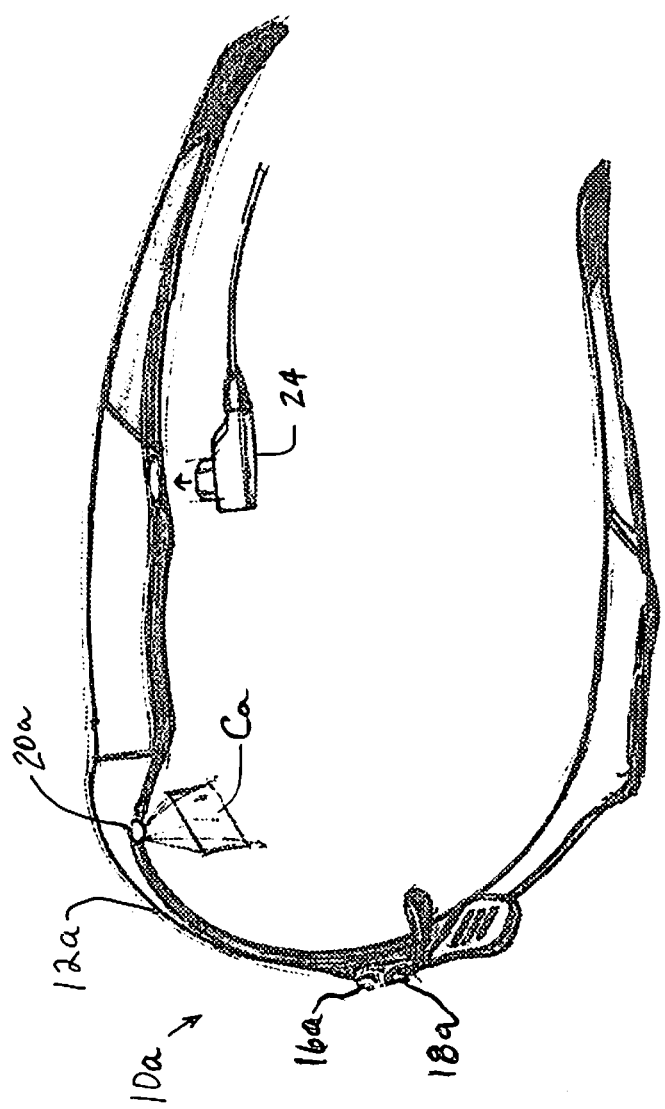
FIG. 3 is a perspective view of an alternate embodiment showing a self-contained frame cam member with multiple integrated cameras.

With specific reference now to the figures in detail, it is stressed that the particulars shown are by way of example and for the purposes of illustrative discussion of the preferred embodiment of the present invention and are presented in a cause of providing what is believed to be the most useful and readily understood description of the principles and conceptual aspects of the invention. In this regard no attempt has been made to show aspects of the invention in more detail than is necessary for a fundamental understanding of the invention. The description when taken together with the drawings should make it apparent to those skilled in the art how the preferred form of the invention may be embodied in practice.

Referring now in detail to FIG. 1 of the drawings, there is shown an eyeglass recorder 10 of this invention. The eyeglass recorder 10 includes a clip cam member 12. The clip cam member 12 is adapted for attachment to conventional eyeglasses 14 and as shown in FIGS. 1 and 2, and can be releasably securable, by frictional fit, spring-clamp or equivalent fastener to a temple member 15 of the eyeglasses 14. It should be further noted that the eyeglasses 14 can optionally be fitted with prescription lenses if needed.

The clip cam member 12 includes a forwardly directed scene camera 16 and a downwardly directed scene camera 18. As best shown in FIG. 2 the camera 16 has a line of sight 17 substantially coincident with the longitudinal axis of the temple member 15 and generally corresponding to the viewer's horizontal line of sight. The scene camera 18 has a line of sight 19 depending at an angle Δ of approximately 45° below the viewer's line of sight 17 as illustrated in FIG. 2.

Typically, the scene cameras 16, 18 have a 90° horizontal field of view for recording what the viewer is looking as is diagrammatically illustrated in FIG. 1 with the forwardly directed field of view being indicated at A and the downwardly directed field of view being indicated at B. Additionally, an eye motion camera 20 is directed transversely with respect to the temple member 15 and is focused on the side of the viewer's eye for recording eye movement within a field of view indicated at C.

The cameras 16, 18, 20 preferably have a 16 GB memory for high definition digital imaging and battery power for at least one hour of use. Further by way of example, the cameras 16 18, 20 have a high speed shutter, with a minimum speed of 1/60 second, and a frame rate of at least 48 frames per second. An on/off switch 22 is used for activating the cameras 16, 18, 20. When activated, the eye motion camera 20 is directed at the side of the viewer's eye located in the field of view C, and is focused on a vein or other imperfection in the eye that is used as a reference point for recording the saccadic eye movement measurements to provide an indication of viewer interest in the scene as more fully discussed in U.S. Pat. No. 7,641,341 incorporated herein by reference. The eye motion camera 20 and/or another similar camera can also record rotation of the eye to differentiate when the viewer is looking at the forward field of view A or at the downward field of view B. Further a light sensor (not shown) can be used to automatically change the visual spectrum of the eye motion camera 20 to compensate for differing light conditions.

In accordance with the method of this invention, the viewer while wearing the eyeglass recorder 10, is presented with stimuli such as product packaging or retail shelf displays, in a simulated or actual shopping environment. The scenes viewed are recorded by the cameras 16, 18 while simultaneously recording eye motion with the camera 20. The recorded scenes and eye motion data may be transmitted, for example, by Wi-Fi, to a location remote from the eyeglass recorder 10. The recorded data is then analyzed by frame segregation or "freeze" frames. The recorded eye motion frames can be compared with the scene frames e.g. by superimposing the respective frames, for determining by the recorded rotational eye movement the scenes that were viewed, and by the recorded saccadic motion detection, the scenes or portion of the scenes that were of particular interest to the viewer. This information can then be used for consumer market research and/or for general study of human behavior.

Figure 4:
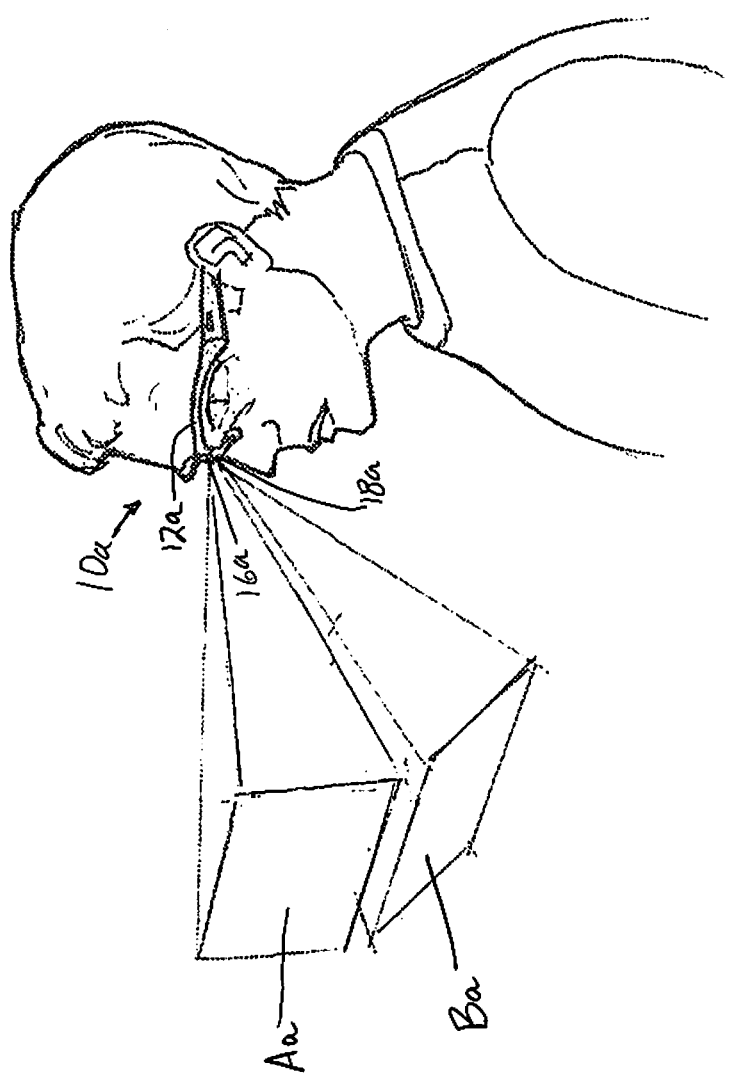
FIG. 4 is a view of a person wearing the frame cam member of FIG. 3 and illustrating diagrammatically an eye level field of view and a downwardly directed field of view.

An alternative embodiment of the invention, is shown in FIGS. 3 and 4 wherein like references numerals and/or letters with the suffix "a" are intended to represent corresponding elements in the first described embodiment. An eyeglass recorder 10a is defined by a frame cam member 12a. The frame cam member 12a has an integrated and self-contained forwardly directed scene camera 16a and a downwardly directed scene camera 18a. With reference to FIG. 4 the scene cameras 16a records what the viewer is looking as diagrammatically illustrated in FIG. 4 with the forwardly directed field of view being indicated at Aa and the downwardly directed field of view being indicated at Ba. Additionally, an eye motion camera 20a is directly transversely for focusing on the side off the viewer's eye for recording eye movement within a field of view indicated at Ca. A plug-in jack 24 provides optional connectivity for transmitting the recorded data remotely from the frame cam member 12a.

In view of the foregoing, it should now be apparent that there is provided an eyeglass recorder with multiple scene cameras and saccadic motion detection which achieves the various preferred objects of this invention and which is well adapted to meet conditions of practical use. Since other various possible embodiments might be made of the present invention or modifications might be made in the exemplary embodiment set forth and method described herein, it is to be understood that all of the above are to be interpreted in an illustrative sense and not in a limiting sense.

Having thus described the invention, there is claimed as new and desired to be secured by Letters Patent:

1. An eyeglass recorder selectively attachable to conventional eyeglasses for recording visual stimuli presented to and discernable by a subject wearing the eyeglasses and for assessing the level of interest in the stimuli presented to the subject, comprising a clip cam member having at least two scene cameras for recording the visual stimuli without using eye reflected illumination, and at least one eye motion camera, with a first scene camera having a forwardly directly field of view substantially along the subject's horizontal line of sight and a second scene camera having an angularly directed field of view with respect to the subject's horizontal line of sight, the eye motion camera being focusable on a side of the subject's eye, said scene cameras being adapted for recording the stimuli as viewed by the subject, said eye motion camera being adapted for concurrently recording eye movement as a function of eye engagement with the visual stimuli with the degree of eye engagement being indicative of the subject's level of cognitive interest in the stimuli viewed.

2. An eyeglass recorder as claimed in claim 1 wherein the eye motion camera is adapted to record rotational movement of the subject's eye to differentiate between the subject's viewing of stimuli recorded by either the first scene camera or the second scene camera.

3. An eyeglass recorder as claimed in claim 1 wherein the second scene camera has a field of view angularly directed downwardly from the subject's forwardly directed field of view.

4. An eyeglass recorder as claimed in claim 1 wherein the eye motion camera is focusable on a reference point on the side of the subject's eye.

5. An eyeglass recorder as claimed in claim 4 wherein the reference point is a visible characteristic on the subject's eye used for detecting saccadic eye movement.

6. An eyeglass recorder as claimed in claim 1 wherein the recorded stimuli and the recorded eye movement are transmittable from the eyeglass recorder to a remote location for analysis.

7. An eyeglass recorder adaptable for attachment to conventional eyeglasses for recording visual images perceivable by a subject wearing the eyeglasses for assessing the level of interest in the images viewed by the subject, comprising a clip cam member having at least two image recording cameras, and at least one eye motion recording camera, with a first image recording camera having a forwardly directed field of view substantially along the subject's horizontal line of sight and a second image recording camera having a downwardly directed field of view from the subject's horizontal line of sight, the eye motion camera being focusable on a side of the subject's eye to detect and record the subject's saccadic eye motion as a function of eye engagement for assessing the subject's level of interest in the respective images viewed.

8. An eyeglass recorder as claimed in claim 7 wherein the eye motion camera records displaceable movement of the subject's eye for discerning whether the subject is viewing the forwardly directed field of view or the downwardly directly field of view.

9. An eyeglass recorder as claimed in claim 7 wherein the recorded images and eye movement is transmittable from the eyeglass recorder to a remote location for viewing and analysis.

10. An eyeglass recorder as claimed in claim 1 wherein the recording cameras are self-contained within a frame cam member.

11. An eyeglass recorder as claimed in claim 1 wherein the scene cameras are preferably high definition cameras having a minimum shutter speed of at least $\frac{1}{60}$ of a second.

12. An eyeglass recorder as claimed in claim 1 further including a light sensor for automatically changing the visual spectrum of the eye motion camera to adjust for lighting conditions.

13. A method for consumer market research using an eyeglass recorder as claimed in claim 2 comprising the steps of:
   presenting visual stimuli to a subject;
   recording the stimuli viewed by the subject at eye level and below eye level;
   monitoring subject's eye movement during the subject's viewing of the stimuli;
   analyzing the eye movement as a function of eye engagement; and
   utilizing eye engagement for assessing the subject's level of interest in the respective stimuli viewed.

14. A method for consumer market research as claimed in claim 13 further including the step of:
   monitoring the rotational movement of the subject's eye during the subject's viewing of the stimuli for determining if the subject is viewing stimuli at eye level or below eye level field of view.

* * * * *